UNITED STATES PATENT OFFICE.

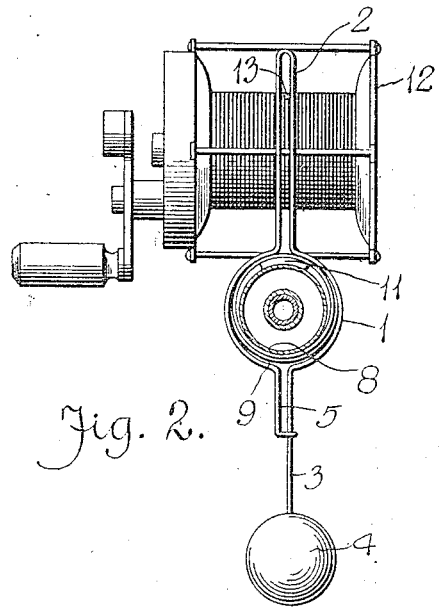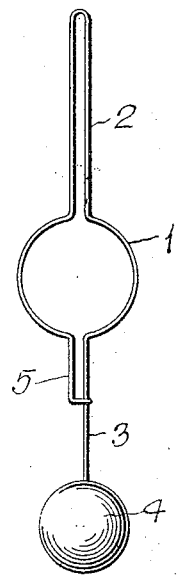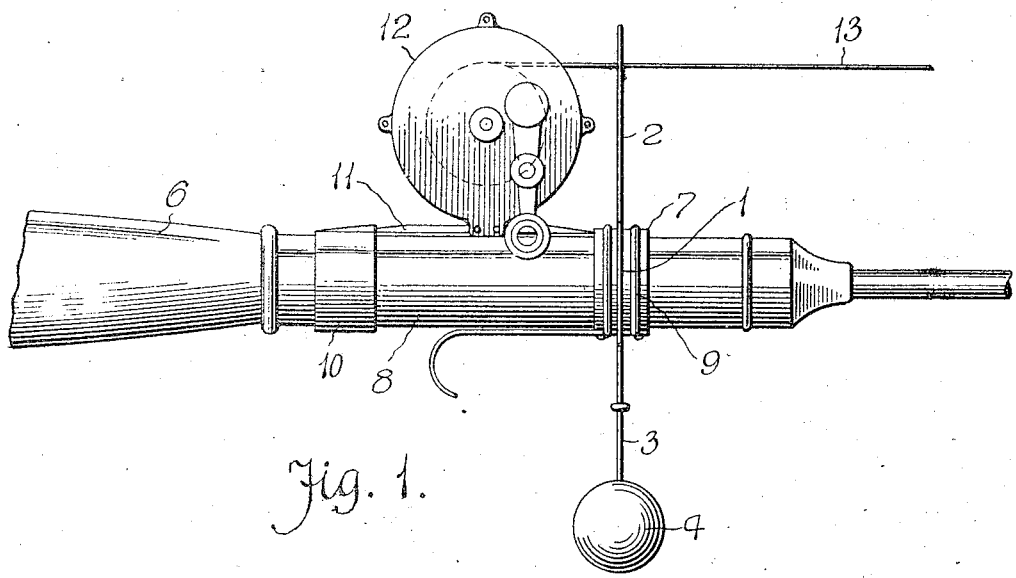

BYRON B. COMPARET, OF DEVILS LAKE, MICHIGAN.

FISH-LINE GUIDE.

1,199,740.  Specification of Letters Patent.  Patented Sept. 26, 1916.

Application filed May 8, 1916. Serial No. 96,015.

*To all whom it may concern:*

Be it known that I, BYRON B. COMPARET, a citizen of the United States of America, residing at Devils Lake, in the county of Lenawee and State of Michigan, have invented certain new and useful Improvements in Fish-Line Guides, of which the following is a specification, reference being had therein to the accompanying drawings.

This invention relates to fish line guides and the primary object of my invention is to furnish a fishing rod with a gravity line guide arm in proximity to a reel, to guide the fishing line upon the reel in uniform layers, whereby bunching of the line is eliminated.

A further object of my invention is to provide a simple, durable and inexpensive fish line guiding device that can be easily mounted upon a fishing rod to guide the fishing line on to a reel carried by the rod; the device not interfering with bait casting, and in this connection, tending to prevent snarling or back lashing of the fishing line insomuch that the line has previously been uniformly wound upon the reel and can be freely stripped therefrom during casting.

The fishline guiding device possesses other advantages which will be apparent to followers of the piscatorial art, and reference will now be had to the drawing showing a preferred embodiment of my invention, but it is to be understood that the device is applicable to various styles of fishing rods and that its structural elements may be varied or changed without departing from the scope of the appended claims.

In the drawings, Figure 1 is a side elevation of a portion of a fishing rod equipped with the line guiding device; Fig. 2 is a cross sectional view of the rod showing the relation of the line guiding device to a reel, and Fig. 3 is a front elevation of a detached line guiding device.

The device can be made of a rigid piece of non-corrodible wire or similar material bent to provide a rod engaging portion or ring 1, having a yoke guide arm 2 and an opposed gravity arm portion 3 which is provided with a weight 4 of suitable form and material. As previously mentioned, the device can be made of a single piece of wire and the wire is bent upon itself to form the yoke guide arms 2 and also a hooked portion 5 in parallelism with the gravity arm 3 and adapted to be connected thereto. The hook or eye connection with the gravity arm 3 permits of the rod engaging portion or ring 1 being strung sufficiently to be slipped over the outer end of a rod handle or butt 6 and mounted upon the slide band 7 of a reel seat 8, to be loosely held between beads or ribs 9 of the band. The slide band 7 coöperates with a fixed band or socket 10 in holding the base 11 of the reel 12, and since the line guiding device is loosely held upon the band 7, the yoke guide arm 2 is positioned in front of the reel 12, and can guide the fish line 13 on to the reel. By oscillating or turning the rod by the hand gripping the handle or butt 6, the reel 12 will be shifted back and forth transversely behind the arm 2 and as the fishline is wound upon the reel 12, the arm 2 will guide the line on to the reel in uniform layers. This may be better understood by considering the arm 2 as swinging back and forth across the front side of the reel to guide the line thereon, but instead of manually guiding the line or manually actuating a line guiding device, the device is automatically actuated by simply oscillating or turning the rod while the fishline is wound upon the reel.

The length of the yoke arm 2 of the device is sufficient to guide the line for each convolution that may be placed on the reel, and the weight 4 is a sufficient distance from the rod engaging portion or ring 1 to correctly move the arm 2 by gravity when the rod is oscillated or turned.

I attach considerable importance to the simplicity of construction and the fact that the device once installed does not detract a fisherman's attention from the casting of a bait or the landing of a fish, as the device is automatically actuated when casting a line and it is an extremely easy matter to oscillate or turn the rod when reeling in a line.

It is thought the operation and utility of the device will be apparent without further description, and since some fishermen prefer the reel upon the bottom side of a rod, I reserve the right to make the gravity arm of sufficient length to serve functionally as a line guide arm.

What I claim is:—

1. As a new article of manufacture, a fishline guide made of a single piece of wire bent to provide a rod engaging portion, a line guiding arm, and a weight support.

2. As a new article of manufacture, a line guiding device made of a single piece of wire bent to form a rod engaging portion, and a pivoted gravity arm and a guide having a traversing movement with said arm.

3. A fishline guiding device comprising a rod engaging ring portion, and a pivoted gravity arm and guide having a traversing movement with said arm.

4. A fishline guiding device adapted for attachment to a fishing rod, comprising a single piece of wire bent to provide a rod engaging portion, a yoke line guide arm, and a gravity arm opposed to said guide arm and provided with a weight.

5. The combination with a reel seat band, of a ring loosely mounted on said band, a line guide arm carried by said ring, and a gravity arm carried by said ring in opposed relation to the line guide arm.

In testimony whereof I affix my signature in the presence of two witnesses.

BYRON B. COMPARET.

Witnesses:
JENNIE ANDERSON,
THERESA HICKEY.